(12) United States Patent
Xie et al.

(10) Patent No.: US 11,025,987 B2
(45) Date of Patent: Jun. 1, 2021

(54) PREDICTION-BASED REPRESENTATION SELECTION IN VIDEO PLAYBACK

(71) Applicant: HULU, LLC, Santa Monica, CA (US)

(72) Inventors: Lan Xie, Beijing (CN); Shenglan Huang, Beijing (CN); Wenhao Zhang, Beijing (CN)

(73) Assignee: HULU, LLC, Santa Monica, CA (US)

( * ) Notice: Subject to any disclaimer, the term of this patent is extended or adjusted under 35 U.S.C. 154(b) by 0 days.

(21) Appl. No.: 16/541,999

(22) Filed: Aug. 15, 2019

(65) Prior Publication Data

US 2021/0051368 A1 Feb. 18, 2021

(51) Int. Cl.
*H04N 21/45* (2011.01)
*H04N 21/454* (2011.01)
*G06N 3/08* (2006.01)
*H04N 21/44* (2011.01)
*H04N 21/23* (2011.01)
*H04N 21/4545* (2011.01)

(52) U.S. Cl.
CPC .......... *H04N 21/454* (2013.01); *G06N 3/08* (2013.01); *H04N 21/44008* (2013.01)

(58) Field of Classification Search
USPC .................... 386/270, 263, 343, 278
See application file for complete search history.

(56) References Cited

U.S. PATENT DOCUMENTS

| 2006/0026294 A1* | 2/2006 | Virdi .................. H04N 21/658 709/232 |
| 2011/0066673 A1* | 3/2011 | Outlaw ............... H04L 65/4092 709/203 |
| 2016/0192029 A1 | 6/2016 | Bergstrom |

FOREIGN PATENT DOCUMENTS

| KR | 1020160031642 A | 3/2016 |
| KR | 1638509 B1 | 7/2016 |
| KR | 1020170135069 A | 12/2017 |
| KR | 1020190088380 A | 7/2019 |

OTHER PUBLICATIONS

International Search Report and Written Opinion for International Application No. PCT/US2020/04566 dated Oct. 26, 2020, 10 pages.

* cited by examiner

*Primary Examiner* — Daquan Zhao
(74) *Attorney, Agent, or Firm* — Fountainhead Law Group P.C.

(57) ABSTRACT

In some embodiments, a method receives playback information for a plurality of representations based on one or more videos being played at a media player. The plurality of representations have at least one different characteristic that affects playback of the video. A dropped-frame measurement is predicted for the plurality of representations based on the playback information. Then, the dropped-frame measurement is compared to a threshold for the plurality of representations. The method marks a first set of the plurality of representations as not being available based on the comparing. A second set of the plurality of representations are provided to the media player when the media player requests a video for playback and the first set of the plurality of representations for the video are blocked from being requested by the media player.

20 Claims, 12 Drawing Sheets

PREDICTION-BASED REPRESENTATION SELECTION IN VIDEO PLAYBACK

BACKGROUND

When playing a video, a media player may drop video frames that are not decoded in a timely manner. When a video frame is dropped, the media player does not attempt to display a video frame. The media player may drop the video frame for different reasons. For example, the media player may drop a video frame if the decoding of the video frame misses a display deadline. For example, if decoding of a frame takes longer than a specified time period, then the frame is dropped. In another example, upon displaying a previous frame in the video, the media player may require that the subsequent frame be decoded and available for display within a time period after the display of the previous frame.

A video, such as a show or movie, may be encoded in multiple representations that include different characteristics, such as different resolutions, frame rates, etc. Different combinations of the characteristics may be used. That is, a show may be encoded in a first resolution and a first frame rate, a first resolution and a second frame rate, a second resolution and the first frame rate, the second resolution and the second frame rate, a third resolution and the first frame rate, etc. During playback, some of these video representations may lead to a high dropped-frame ratio, which is a measurement of the number of frames that are dropped versus the number of frames that are displayed for a representation. The dropping of video frames may occur when playing video representations that have certain characteristics, such as a high resolution or a high frame rate. A higher resolution means that more pixels are included in a frame and a higher frame rate means more frames are sent per time period. A higher resolution or a higher frame rate requires more computing resources at the media player to decode the frames during a time period. When the computing resources are not sufficient, the media player cannot decode the frames within a required time period, resulting in the dropping of frames.

The dropping of frames during playback may lead to playback discontinuity and decrease the quality of the user's experience. For example, since a frame is dropped, the user will see content that may be choppy because some frames are not displayed in the video. Also, the media player may experience rebuffering because the dropped frames decrease the amount of frames in a buffer, and the media player might have to wait until some frames are decoded and stored in the buffer to continue playback.

DETAILED DESCRIPTION

Described herein are techniques for a video playback system. In the following description, for purposes of explanation, numerous examples and specific details are set forth in order to provide a thorough understanding of some embodiments. Some embodiments as defined by the claims may include some or all of the features in these examples alone or in combination with other features described below and may further include modifications and equivalents of the features and concepts described herein.

Some embodiments predict which representations for a video may result in a dropped-frame ratio that is above a threshold. For example, the video may be encoded in multiple representations that have different combinations of characteristics, such as resolution, frame rate, etc., that may affect the playback of respective representations of the video. Some embodiments may use historical playback performance for a media player that is playing the video to determine whether one or more representations for the video should be unavailable to that media player during playback. For example, a prediction network may predict a dropped-frame measurement, such as a dropped-frame ratio, for representations of the video before a user requests the video for playback. If a predicted dropped-frame ratio is above a threshold, then the system may mark the representation as being unavailable. When a media player requests the video for playback, the system may provide a list of representations for the video that are available for playback while blocking the representations that are not available from the media player.

Accordingly, by not allowing the media player to request some representations that have been predicted to result in a high dropped-frame ratio, the playback of the video at the media player may be improved. For example, a media player may not request a representation that may result in a high dropped-frame ratio. If that representation was not blocked, the media player may request that representation, and then, while playing the video, the media player may experience a high dropped-frame ratio. Upon detecting this, the media player may request another representation. However, the media player may have experienced playback issues due to the dropped frames that were experienced while using the representation. By predicting that the representation may result in a high dropped-frame ratio, some embodiments avoid having a media player request a representation that may result in a high dropped-frame ratio, thereby avoiding some playback issues.

System

Figure 1:
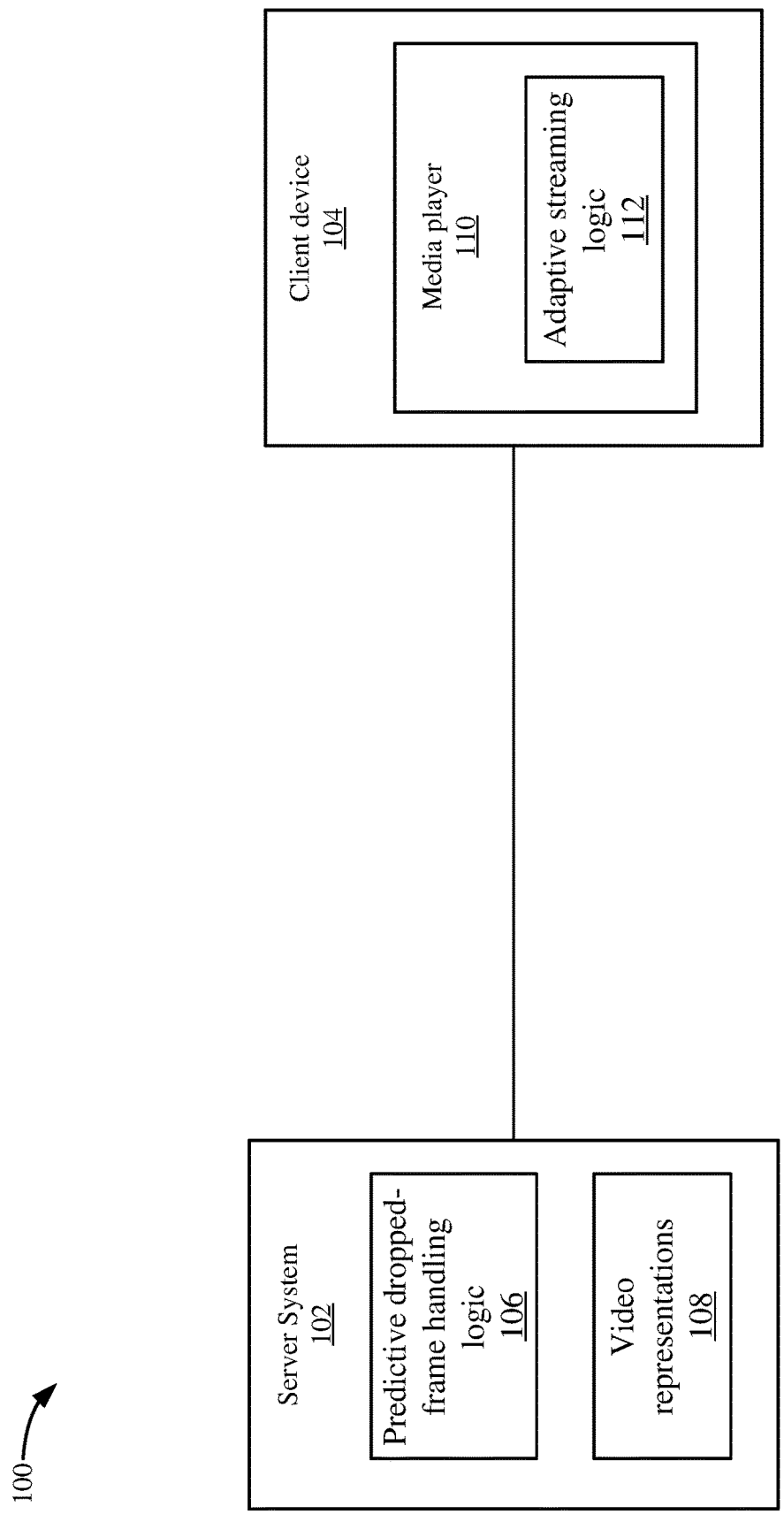
FIG. 1 depicts a simplified system for predicting dropped-frame measurements according to some embodiments.

FIG. 1 depicts a simplified system 100 for predicting dropped-frame measurements according to some embodiments. System 100 includes a server system 102 and a client device 104, although multiple server systems 102 and multiple clients 104 may be used. Client device 104 may be a computing device that can play videos, such as a smartphone, tablet device, set-top box, television, etc., or any combination of the above. Client device 104 may include a media player 110 that can play a video. For example, media player 110 may request a video from server system 102 of a video delivery system. In some embodiments, the video delivery system may offer a library of videos from which media player 110 can request.

Server system 102 may include different video representations of videos in storage 108. A video representation includes a combination of characteristics. For example, characteristics may include a resolution and frame rate. The frame rate may be the number of frames that is sent per time period, such as per second. The resolution is a measurement of pixels in the video frame. For example, resolution may be 1024×768, 1920×1080, etc. The resolution 720 p may be 1280×720 pixels which may be a width of 1280 pixels and a height of 720 pixels. A resolution of 1080 p may be 1920×1080 which is a width of 1920 pixels and a height of 1080 pixels in a video frame. A bitrate may be the amount of data that is sent per second and may depend on the resolution and the frame rate used. Different combinations may be formed from the characteristics.

Each representation may be associated with a video file that includes characteristics of the representation; for instance, the video of the video file may have a resolution and frame rate associated with the representation. That is, the same movie may be stored in different files that have different resolutions and/or frame rates. Also, multiple different videos may be associated with a same representation. For example, for each video (e.g., a show, movie, etc.) offered in the library of videos, server system 102 stores different representations that have different characteristics. That is, a first movie and a second movie are both encoded in a first representation.

The different characteristics may affect playback at media player 110. For example, a higher resolution representation may take longer to decode at media player 110. Also, a higher frame rate may deliver more frames per time period, such as per second, to media player 110 for decoding. Different combinations of resolution and frame rates may affect the decoding time of the frames and thus the display of the video depending on how long the video frames take to be decoded. Also, other factors may affect the number of dropped frames; for instance, the available bandwidth between server system 102 and client device 104 may affect how long it takes to receive information for frames, which may affect the decoding of the video frames. For example, if a high resolution or high frame rate representation is being sent to client device 104, then a low bandwidth connection may result in fewer video frames being received by client device 104 per a time period, such as per second, which may mean a video frame has not been received when it should have been displayed. Further, computing resource usage at client device 104 may affect the decoding time because if computing resources are not available or if there is a computing resource usage spike, then the decoding time will take longer. For example, the number of dropped frames may be affected by the performance of hardware, such as a computer processing unit (CPU), a graphics processing unit (GPU), storage, etc. For example, if a high resource load is occurring, then the decoder may not be able to decode a frame within a specified time interval.

When media player 110 is playing a representation of a video, adaptive streaming logic 112 may analyze a number of frames being dropped. Adaptive streaming logic 112 may use a dropped-frame measurement that is based on a number of frames being dropped during a time window to determine whether to switch to a new representation. The dropped-frame measurement may be a dropped-frame ratio that may measure a ratio of the number of frames being dropped to the number of frames that are played without being dropped during a time window. The dropped-frame ratio is used for discussion purposes, but other measurements of dropped frames may be used, such as a count of the dropped frames in the time period. If the dropped-frame ratio exceeds a threshold, then adaptive streaming logic 112 may decide to switch to another representation. Adaptive streaming logic 112 performs the above logic during the playback of the video. Accordingly, media player 110 may experience some time where frames are being dropped during the playback of the video, which may affect the playback experience for the user. For example, if frames are dropped, then the playback of the video may become choppy due to some frames not being displayed in the video. If media player 110 switches to a representation with a lower resolution, then the number of dropped frames may start to decrease due to the lower resolution frames having fewer pixels to be decoded. A client device 104 with hardware that is experiencing a high usage rate may be able to decode the lower resolution frames faster. The reduced number of dropped frames may improve the playback experience.

When client device 104 is playing a representation of one video and a high dropped-frame ratio is detected, then there may be a high probability that the high dropped-frame ratio may occur when playing another video that is encoded in the same representation. That is, a dropped-frame ratio may depend on the video representation and client device performance, and does not depend on which content is being played.

To avoid playing a representation that may result in a large number of dropped frames before switching to another representation, predictive dropped-frame handling logic 106 may predict representations of a video that may result in dropped-frame ratios that degrade the quality of the playback before playback of a representation for a video. For example, before playback of a video begins, predictive dropped-frame handling logic 106 may analyze the representations of the video to determine which representations may result in a dropped-frame ratio that is above the threshold. Predictive dropped-frame handling logic 106 may then mark these representations as being unavailable, which means that media player 110 cannot request these representations for playback. When media player 110 starts playback of the video, media player 110 can request representations that have not been marked unavailable by predictive dropped-frame handling logic 106. Accordingly, media player 110 may avoid requesting representations that may result in a high dropped-frame ratio and this may improve the playback quality of the video by not having to switch from one representation that results in a high dropped frame ratio to another representation that may not drop as many frames.

Client Device

Figure 2:
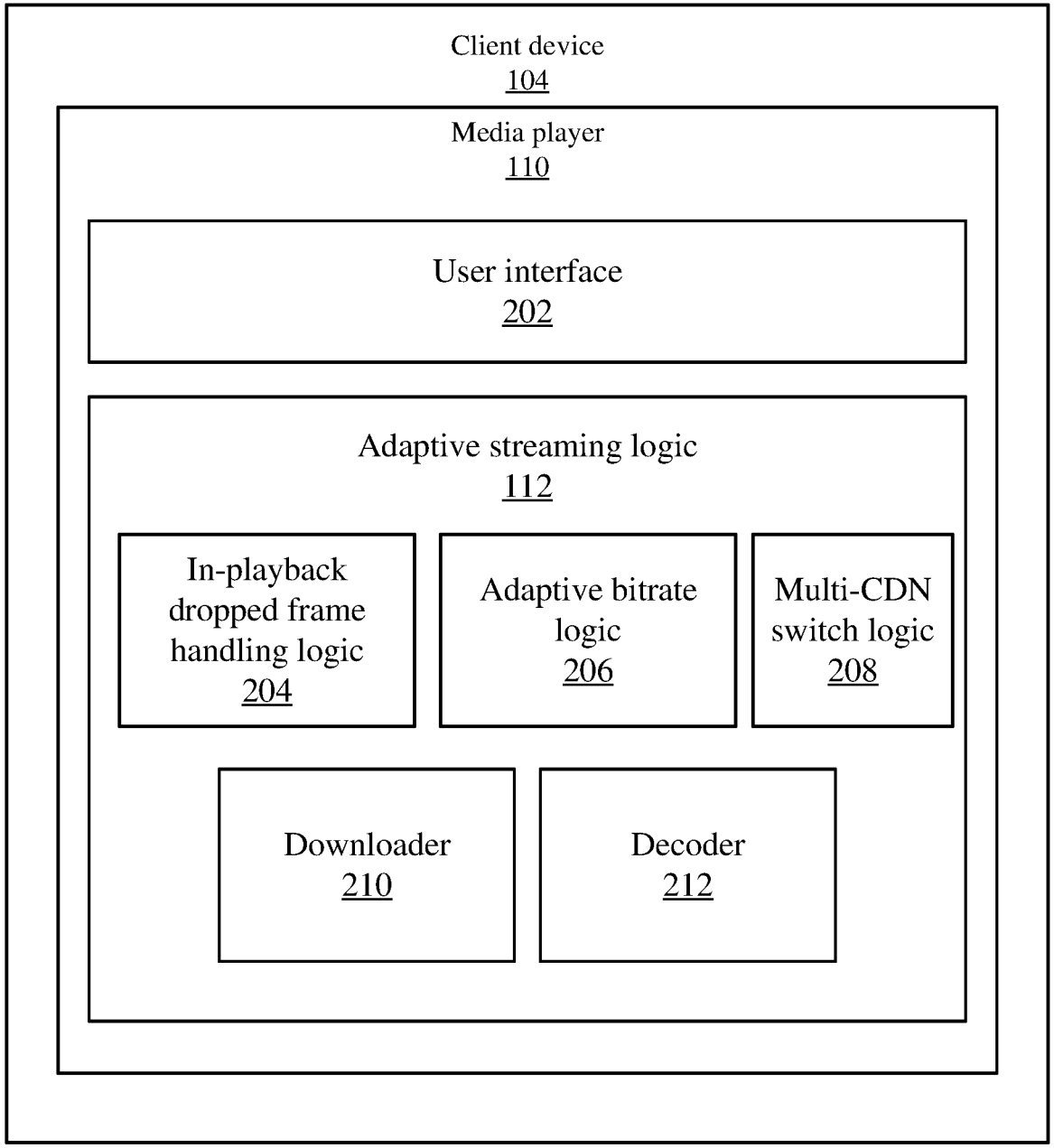
FIG. 2 depicts a more detailed example of a client device according to some embodiments.

FIG. 2 depicts a more detailed example of client device 104 according to some embodiments. Media player 110 may include a user interface 202 that may display the video. Additionally, user interface 202 may allow a user to browse a video library to select videos to play. Before displaying a video frame in user interface 202, media player 110 receives an encoded video frame and decodes the video frame. For example, a downloader 210 may download video frames for a representation of the video from server system 102 or another system, such as a content delivery network.

The video frames that media player 110 receives are encoded and then need to be decoded by a decoder 212 before media player 110 can display the frames in user interface 202. The decoding time may vary based on the characteristics of the representation. For example, a higher resolution video frame may take longer for decoder 212 to decode the video frame because more information is decoded compared to a frame with a lower resolution. A high frame rate representation may send more frames to decoder 212 over a period of time, which may cause decoder 212 to take longer to decode a video frame because more computing resources are needed to decode the larger number of frames during a time period compared to a lower frame rate representation. Also, the relationship between frame rate, decoding time, and dropped-frame ratio is decided by the settings of decoder 212. If decoder 212 is configured to decode the video with a maximum framerate of 30 frames per second (fps), when playing a video with higher framerate than 30 fps, the decoding time and dropped-frame ratio will be high. On the other hand, if decoder 212 is configured to decode the video with a maximum framerate of 60 fps, the decoding time and dropped frame ratio may not be high when playing a video with a maximum framerate of 30 fps because decoder 212 can decode 60 fps video. Once decoder 212 has decoded a video frame, media player 110 can display the video frame in user interface 202. As video frames are decoded in sequence, media player 110 plays the video frames sequentially in user interface 202.

Adaptive bitrate logic 206 may request different representations of the video. For example, if adaptive bitrate logic 206 detects that available bandwidth is going down, then adaptive bitrate logic 206 may request a representation that includes a lower resolution and/or frame rate. Also, a multi-content delivery network (CDN) switch logic 208 may determine when to switch to a different content delivery network. For example, when a CDN goes down and cannot deliver a video to media player 110, multi-CDN switch logic 208 may determine another CDN from which to request the video.

In-playback dropped-frame handling logic 204 may analyze the number of frames being dropped during the playback of a video. If the dropped-frame ratio (or another measurement such as a number of dropped frames per second) meets a threshold, such as the dropped-frame ratio is greater than a threshold during a time window, then in-playback dropped-frame handling logic 204 may send an indication to adaptive bitrate logic 206 to request a different representation of the video. For example, adaptive bitrate logic 206 may request a representation that has a lower resolution or lower frame rate. Also, in-playback dropped-frame handling logic 204 may block adaptive bitrate logic 206 from requesting that representation for the rest of the playback of the video.

In some embodiments, in-playback dropped-frame handling logic 204 may use the following process to determine whether to block a representation. In the i-th interval, the player is playing a specific video representation $\mathcal{R}$. A variable $d_i$ denotes the number of dropped frames and a variable $f_i$ denotes the number of total frames. The duration of an interval is a constant T, e.g., 1 second. The dropped-frame ratio is calculated according to the measurements in a sliding window as follows:

$$\frac{\Sigma_{i \in \Delta}\ d_i}{\Sigma_{i \in \Delta}\ f_i + \text{SMOOTH\_PARAM}},$$

where the size of the sliding window is A, and the value of SMOOTH_PARAM is a constant to smooth the result. The above measures the number of dropped frames over the total number of frames in the sliding window. If the dropped-frame ratio is larger than a threshold, that specific video representation will be blocked during the remainder of the playback.

Server System

Figure 3:
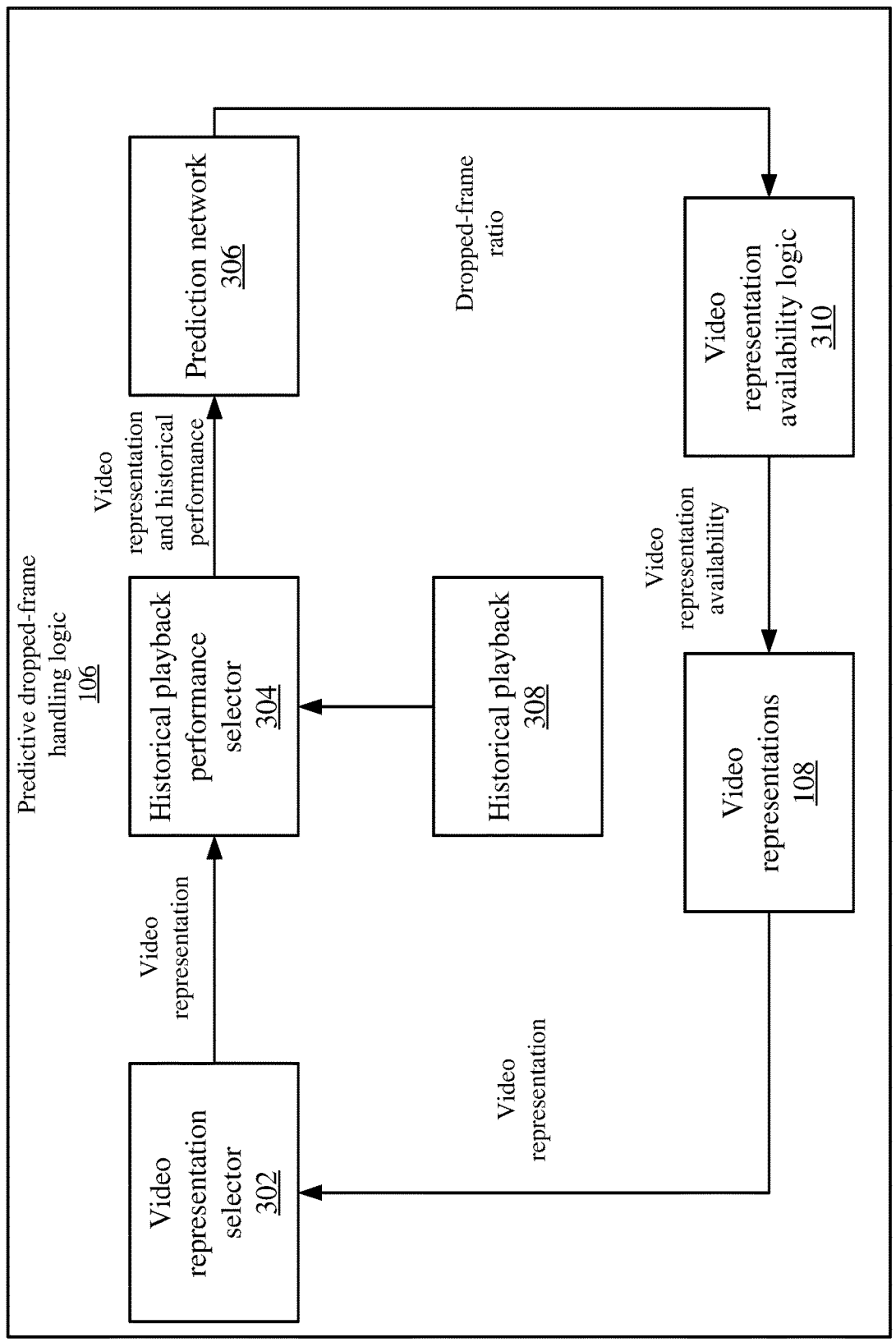
FIG. 3 depicts a more detailed example of predictive dropped-frame handling logic according to some embodiments.

FIG. 3 depicts a more detailed example of predictive dropped-frame handling logic 106 according to some embodiments. Predictive dropped-frame handling logic 106 may select representations that should be marked as unavailable to media player 110 for a video. Predictive dropped-frame handling logic 106 may analyze representations for the video, such as all of the representations of a video, to determine which representations should be marked as unavailable to a media player 110 of a client device 104. Although one analysis for one media player 110 in client device 104 is described, predictive dropped-frame handling logic 106 may perform the analysis for multiple media players 110 that are running in multiple client devices 104. For example, each media player 110 and client device 104 combination may experience different conditions and have different computing resources that may affect the playback of a video.

A video representation selector 302 may select a representation from the video representations that can be requested for a video in storage 108. In some embodiments, a representation may be associated with a feature list that describes characteristics of the video representation. In some embodiments, the feature list may include a frame rate, a resolution, and a decoder type. The resolution may be represented by a width and height of pixels; the frame rate is represented by the number of frames delivered per second; and the decoder type may be based on the type of decoder that is required to decode the representation.

A historical playback performance selector 304 may select historical playback performance information from storage 108 for the representation. For example, a media player 110 for a client device 104 may have played different videos that have a representation with the same characteristics, such as the same resolution or frame rate. Historical playback performance selector 304 may select the playback performance information for the representation from the videos. The historical playback performance may be samples from portions of the playback, such as the samples may be a list of dropped-frame ratios and a corresponding timestamp during the playback. The playback performance list may be denoted as:

$$L_i = \{(r_1^i, t_1^i), \ldots, (r_j^i, t_j^i), \ldots, (r_{n_i}^i, t_{n_i}^i)\},$$

where a variable $r_j^i$ is the average dropped-frame ratio during the playback of video representation R for a user i, a variable j is the index of a session of playing a representation, a variable $t_j^i$ is the start timestamp of the playback of video representation, and $n_i$ is the number of the session of the i-th user playing a specific representation.

Then, historical playback performance selector 304 provides the representation and the historical performance information to prediction network 306. Prediction network 306 may then predict a dropped-frame ratio for the representation. For example, the dropped-frame ratio is a prediction if the representation of the video is played by client device 104. The use of prediction network 306 will be described in more detail below.

Video representation availability logic 310 may mark the representation as available or not available based on the dropped-frame ratio. For example, if the dropped-frame ratio meets a threshold, such as above a threshold, then video representation availability logic 310 may mark the representation as unavailable. For example, if the dropped-frame ratio indicates that a number of dropped frames compared to a number of frames that are successfully decoded and played is above a ratio, then video representation availability logic 310 marks the representation as unavailable. That is, playback using the representation may result in a number of dropped frames that may degrade the quality of the playback. Storage 108 then stores the availability for the representation. For example, video representation availability logic 310 may store a flag with the representation to indicate the representation is unavailable.

Training

Before performing the dropped-frame ratio prediction, prediction network 306 may be trained. For example, prediction network 306 may be a neural network that can predict the dropped-frame ratio based on training of parameters of the network. Although a neural network is described, other prediction methods may be used, such as a rules-based method. In some embodiments, the training may be performed using samples from different client devices associated with different users or from only the client device being used.

Figure 4:
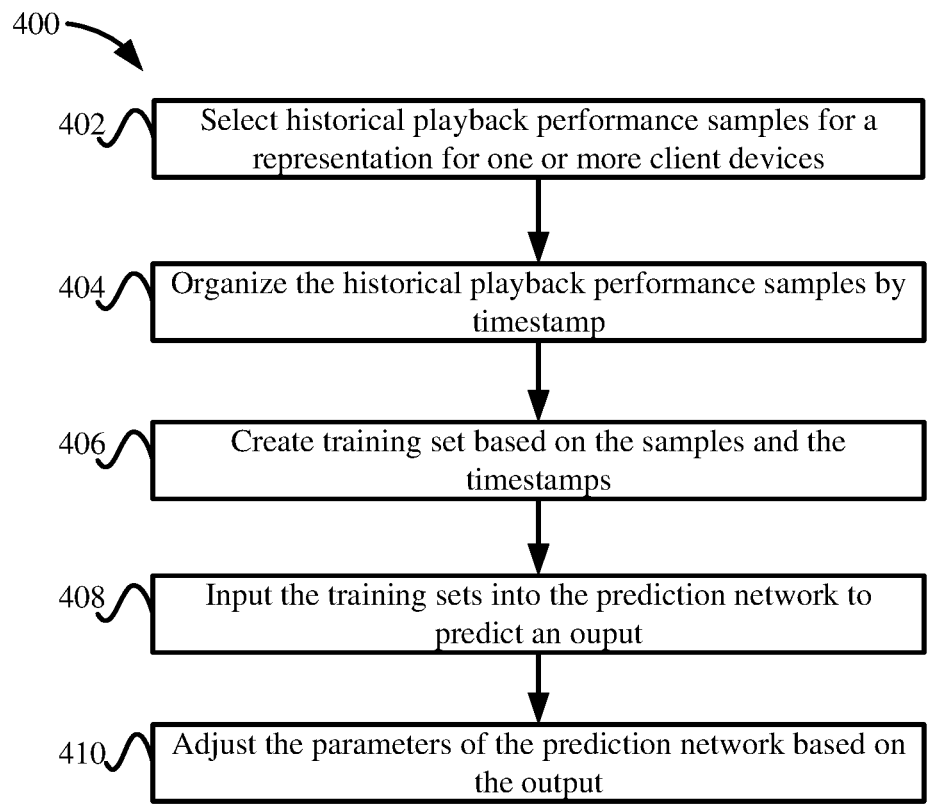
FIG. 4 depicts a simplified flowchart for training a prediction network according to some embodiments.

FIG. 4 depicts a simplified flowchart 400 for training prediction network 306 according to some embodiments. At 402, predictive dropped-frame handling logic 106 selects historical playback performance samples for a representation from playback by one or more client devices. The playback performance samples may list the dropped-frame ratio and the time for portions of a video.

At 404, predictive dropped-frame handling logic 106 organizes the historical playback performance samples by timestamp. For example, predictive dropped-frame handling logic 106 may organize the historical playback performance samples sequentially by timestamp. Other methods of organizing the historical playback performance samples may be appreciated, such as by grouping samples together with similar timestamps. The timestamp may be a time measurement that increases over time. For example, a timestamp, such as a UNIX timestamp, that increases over time may be used. The UNIX timestamp is generated by an operating system and increases sequentially over time. For example, a time on a first day may include a first timestamp of 1,000,000, and a subsequent time later in that day may include a timestamp of 1,000,010, and another timestamp the next day may include a timestamp 1,000,100, and so on. The use of the timestamp as a feature may avoid the impact of random computing resource usage spikes, such as when computer processing unit (CPU) usage increases sharply during a short time period. For example, if a user watches a video with a representation #1 and media player 110 detects a high dropped-frame ratio at a timestamp #1 that is caused by a CPU resource usage spike. Media player 110 may disable representation #1 during the remainder of the playback session of the video. On another day, client device 104 watches another video with representation #1. Media player 110 detects a high dropped-frame ratio at a timestamp #2, which may also be caused by a CPU resource usage spike. If the difference between timestamp #1 and timestamp #2 is large, then it is less predictive to say that representation #1 will lead to a high dropped-frame ratio the next time the representation is used. This is because the representation may have been randomly associated with a CPU resource usage spike and the representation may have been played in between the two times without having any dropped frame problems. However, if representation #1 resulted in multiple high dropped-frame ratios within a short period of time, then it may be more predictive that the representation will always result in a high dropped-frame ratio. It is noted the short period of time may be greater than a threshold. However, since the representation is not used for the rest of the playback of the video, then the next time the representation may experience a high dropped-frame ratio is a next video that is played. This may indicate that client device 104 may have dropped frame issues for the representation whenever the representation is used.

At 406, predictive dropped-frame handling logic 106 creates a training set based on the samples and the timestamps. One method of creating the training set is as follows: given K samples $[(r_{j-k+1}^i, t_{j-k+1}^i), \ldots, (r_{j-1}^i, t_j^i)]$, predictive dropped-frame handling logic 106 wants to predict the dropped-frame ratio $\hat{r}_{j+1}^i$ at timestamp $t_{j+1}^i$. To construct the training set, predictive dropped-frame handling logic 106 uses a point in the samples denoted as $L_i$ as the ground-truth, e.g., $Y_{j+1}^i = r_{j+1}^i$. The point in the samples L may be the next dropped-frame ratio after the inputted samples to prediction network 306 That is, the input to prediction network 306 is the K samples before the ground-truth, e.g., $X_j^i = [(r_{j-k+1}^i, \ldots, (r_j^i, \Delta t_j^i)]$, where $\Delta t_j^i$ is the time difference between the two successive samples, e.g., $\Delta t_j^i = t_{j+1}^i - t_j^i$.

Figure 5:
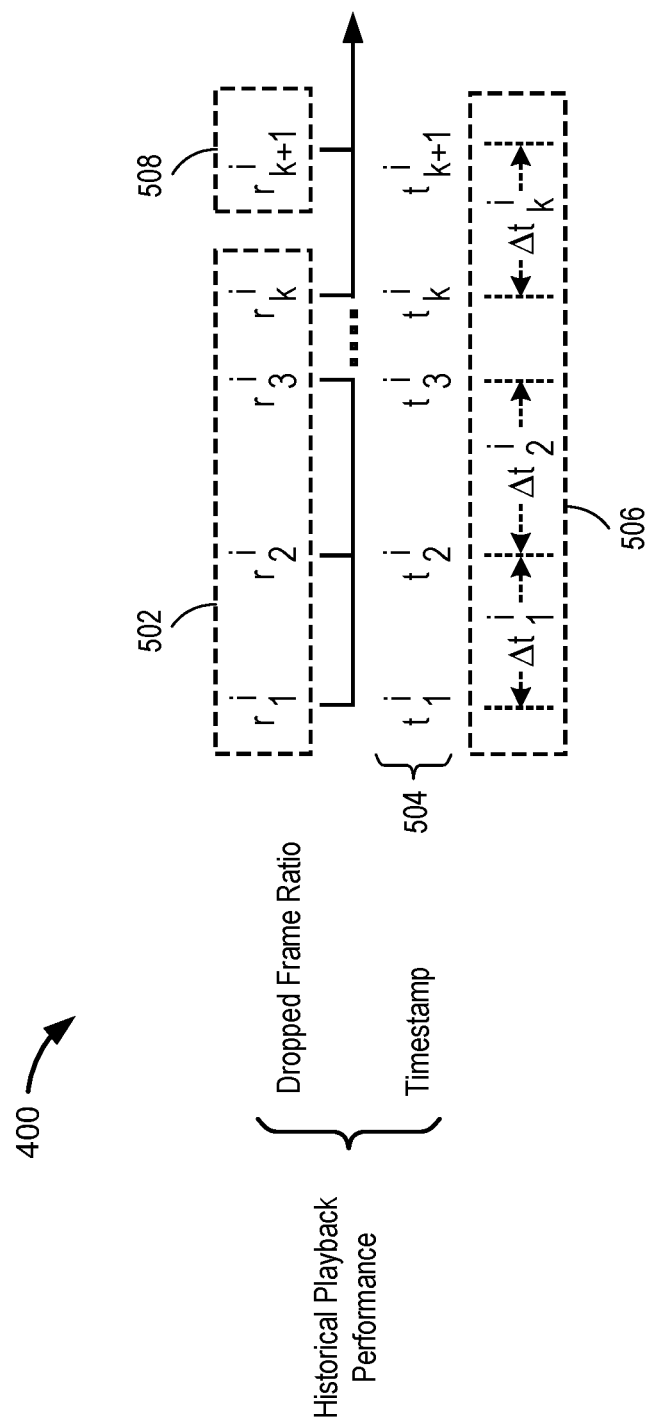
FIG. 5 depicts an example of a relationship between the historical playback performance samples and the timestamps according to some embodiments.

FIG. 5 depicts an example 500 of a relationship between the historical playback performance samples and the timestamps according to some embodiments. At 502, the historical playback performance samples are shown, and at 504, the corresponding timestamps are shown. The difference between the timestamps may be used in the prediction. Thus, at 506, a delta between consecutive timestamps associated with the dropped-frame ratios is calculated.

The training input is provided from the dropped-frame ratios at 502 and the timestamp deltas at 506. At 508, prediction network 306 outputs the predicted dropped-frame ratio.

Figure 6:
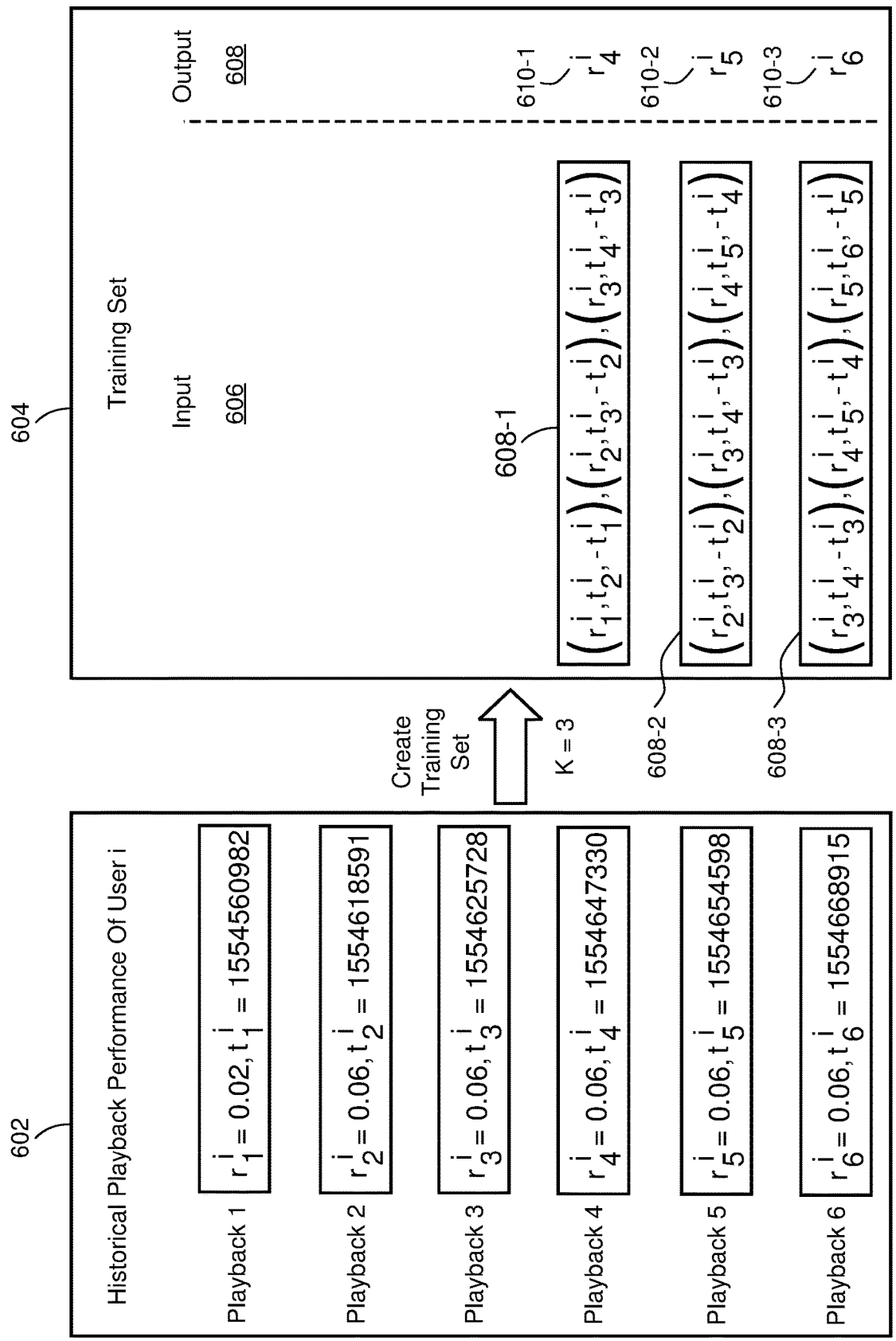
FIG. 6 depicts an example of the training samples according to some embodiments.

FIG. 6 depicts an example of the training samples according to some embodiments. At 602, playback samples #1 to #6 are shown for a client device 104 according to some embodiments. Predictive dropped-frame handling logic 106 creates a training set from the samples. For example, each training set may include information from a number of samples that is based on a number of inputs for prediction network 306. In some embodiments, prediction network 306 may include a number of inputs K=N, where N is a number. Predictive dropped-frame handling logic 106 creates a training set that includes a number of playback samples based on the value of N, which is "3" in this example. For example, an input section 606 shows the input samples to prediction network 306, and an output section 608 shows the outputs of prediction network 306.

A first training sample at 608-1 is associated with the first three playback samples #1, #2, and #3. For example, the dropped-frame ratio for training sample #1 is 0.02 from playback sample #1, and the time difference is the time difference between the timestamp of playback sample #2 and the timestamp of playback sample #1. For example, the timestamp difference may be 1554618591-1554560982. The next training sample may be the dropped-frame ratio of playback sample #2 and the timestamp difference between playback sample #3 and playback sample #2. For example, the dropped-frame ratio may be 0.06 and the timestamp difference may be 1554625728-1554618591. Similarly, the third training sample may be the dropped-frame ratio for playback sample #3 of 0.06 and the timestamp difference may be the timestamp difference between playback sample #4 and playback sample #3 (e.g., 1554647330-1554625728). The predicted output of prediction network 306 in the training set is the dropped-frame ratio of playback sample #4. The output is the dropped-frame ratio of playback sample #4 because prediction network 306 is attempting to predict the next dropped-frame ratio for playback of the representation.

Similarly, the second training set at 608-2 is generated from playback samples #2, #3, and #4. The timestamp differences are based on timestamp differences between playback samples #2 and #3, #3 and #4, and #4 and #5, respectively. The output at 610-2 is the dropped-frame ratio from playback sample #5. The training sample at 608-3 is constructed from playback samples #3, #4, and #5, and the timestamp difference is constructed from timestamps from playback samples #3, #4, #5, and #6. The output at 610-3 is the dropped-frame ratio from playback sample #6. Accordingly, training set 604 includes input training samples 608 and labeled outputs 610.

Referring back to FIG. 4, at 408, predictive dropped-frame handling logic 106 inputs the training sets into prediction network 306 to predict an output. Then, at 410, predictive dropped-frame handling logic 106 adjusts the parameters of prediction network 306 based on the output. For example, the labeled output at 610 is compared to the output of prediction network 306. If any differences occur, predictive dropped-frame handling logic 106 may adjust the parameters of prediction network 306 to predict an output that is closer to the labeled output. For example, the training set at 608-1 is input into prediction network 306, which generates an output. That output is compared to the output at 610-1. Similarly, the training set at 608-2 is input into prediction network 306, which generates an output. That output is compared to the output at 610-2, and so on. Based on the comparison, the parameters of prediction network 306 may be adjusted differently. For example, the parameters are adjusted such that prediction network 306 becomes more accurate at predicting the labeled results from the training samples.

Prediction Network

Figure 7:
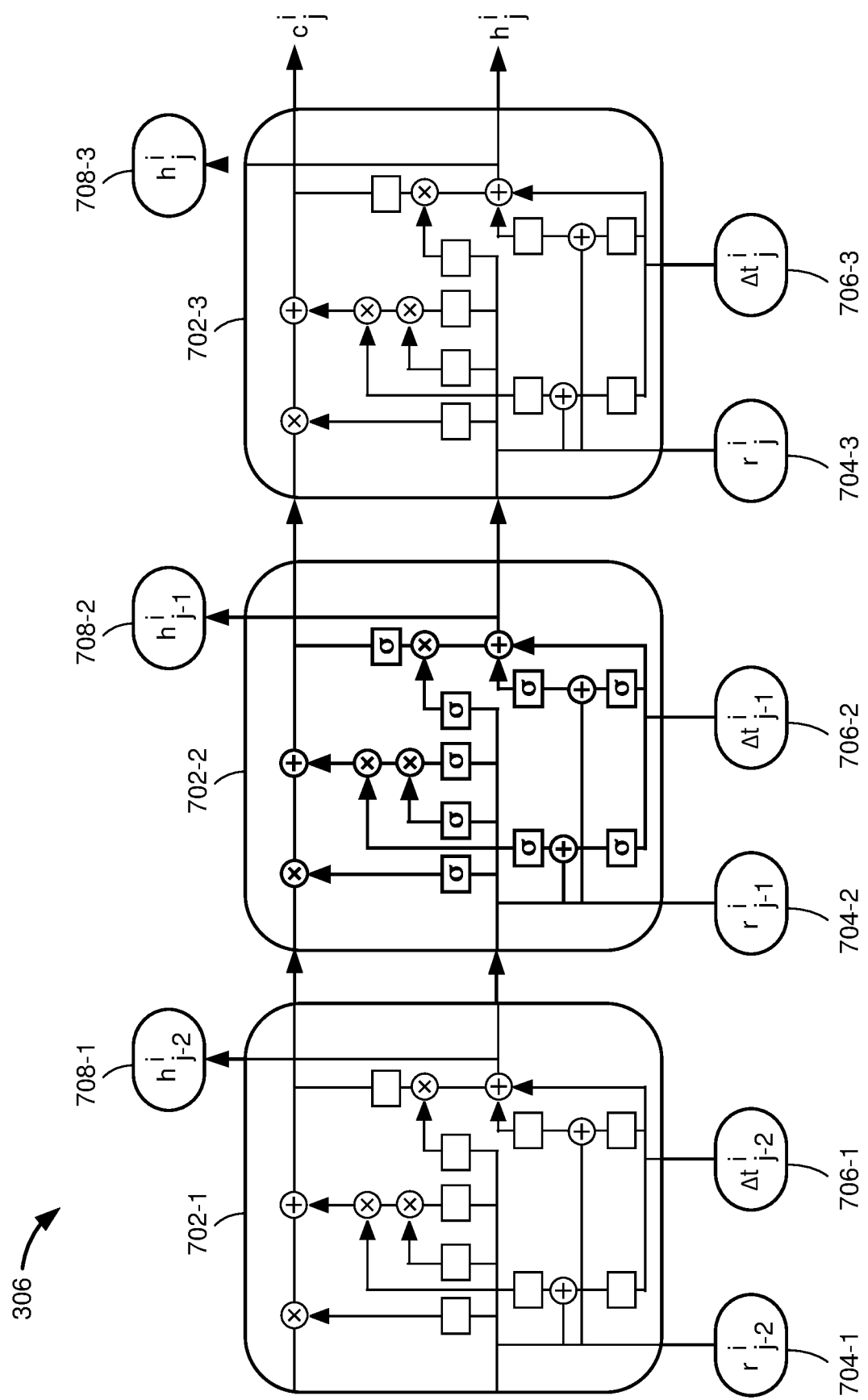
FIG. 7 depicts an example of a prediction network according to some embodiments.

FIG. 7 depicts an example of prediction network 306 according to some embodiments. Prediction network 306 may learn a model that predicts the dropped-frame ratio based on an input of dropped-frame ratios and timestamps. Different prediction networks may be used. In some embodiments, a long-time short-term memory (time-LSTM) network is used. A time-LSTM may be a variant of an LSTM network that uses time in the prediction. The time-LSTM network uses inputs for the time to model time intervals.

Prediction network 306 may include multiple units 702-1 to 702-3 that each can generate a prediction. Although three units are described, any number of units may be used.

Each unit 702 may include an input 704 that receives the dropped-frame ratio. Also, units 702-1 to 702-3 include time inputs 706-1 to 706-3 that receive the time difference associated with each dropped-frame ratio. Each unit 702-1 to 702-3 includes an output 708. Outputs 708-1 to 708-3 are the predicted dropped-frame ratios. In some embodiments, each unit 702 includes logic that may pass information from the prior prediction process to the next unit. This allows prediction network 306 to use the sequential manner of the inputs when performing the prediction and also allows the time difference to be used in determining the predicted dropped-frame ratio. For example, unit 702-2 may use the prior timestamp difference from unit 702-1 when making the prediction.

Prediction Process

Figure 8:
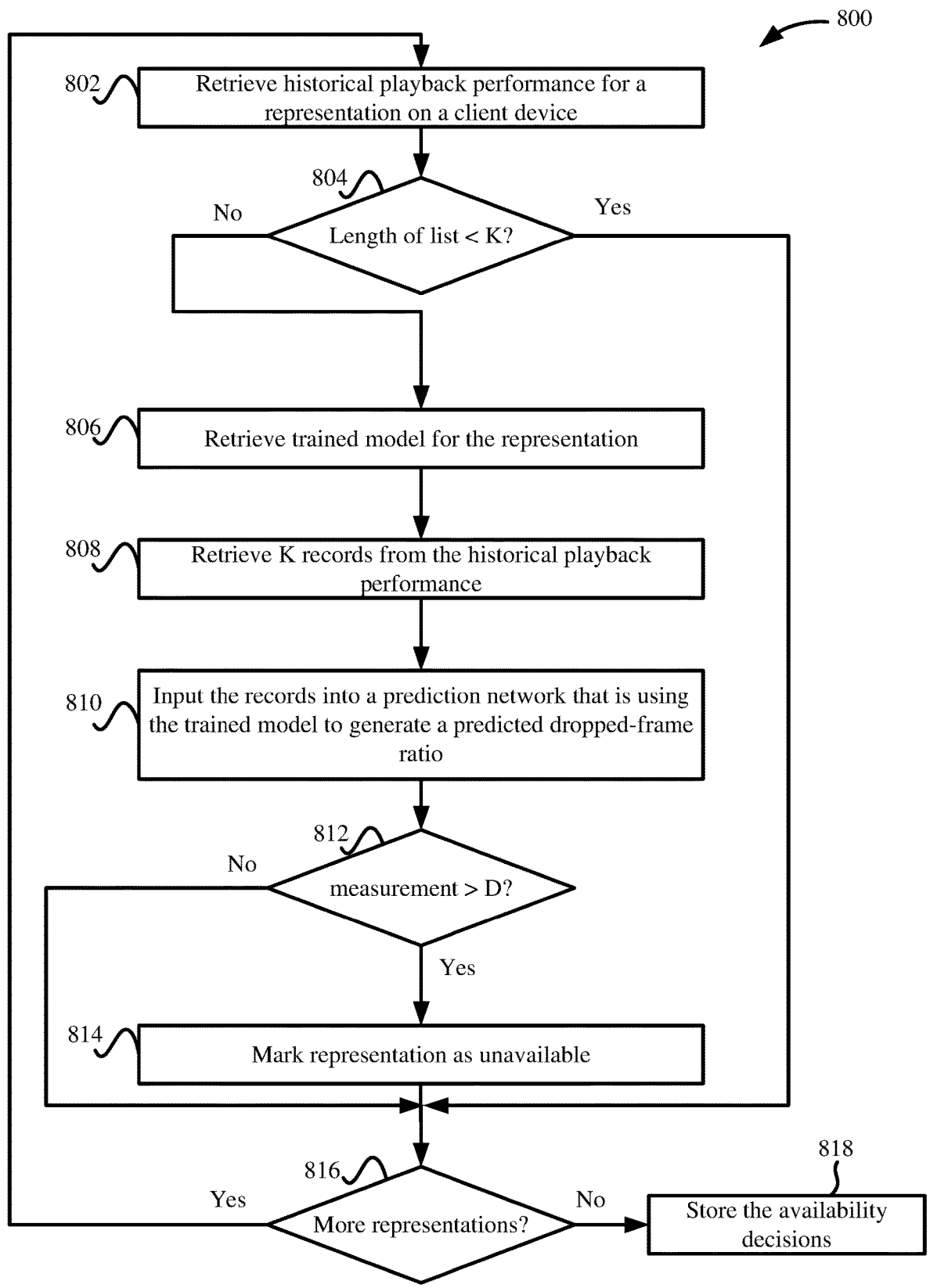
FIG. 8 depicts a more detailed example of the dropped-frame handling prediction according to some embodiments.

FIG. 8 depicts a more detailed example of the dropped-frame handling prediction according to some embodiments. At 802, predictive dropped-frame handling logic 106 retrieves historical playback performance for a representation on a client device.

At 804, predictive dropped-frame handling logic 106 determines if the length of the list is less than the number K. For example, a client device 104 may be required to play videos using a representation a number of times before any representation can be marked as unavailable. This requirement would ensure that random events, such as random CPU usage spikes do not cause a representation to be marked as unavailable. If the length of the list is not less than the number K, at 806, predictive dropped-frame handling logic 106 retrieves a trained model for the representation. For example, each representation may have a specifically-trained model for that representation. If the length of the list is less than the number K, predictive dropped-frame handling logic 106 proceeds to 816.

At 808, predictive dropped-frame handling logic 106 retrieves K records from the historical playback performance. In some embodiments, the latest K records in the historical playback performance are used, but other records may be used. For example, every other record in the historical playback performance may be used until K records are determined. The latest records may be used because these latest records may represent the most recent performance of client device 104 using the representation.

At 810, predictive dropped-frame handling logic 106 inputs the records into prediction network 306, which is using the trained model. Prediction network 306 then generates a predicted dropped-frame ratio. At 812, predictive dropped-frame handling logic 106 determines if the measurement is greater than a threshold D. The threshold may be based on a dropped-frame ratio of the number of dropped frames versus the number of frames that are successfully played during a time window.

If the measurement is not greater than the threshold, then predictive dropped-frame handling logic 106 does not mark the representation as unavailable and proceeds to 816. However, if the measurement does meet the threshold, such as is greater than the threshold, then at 814, predictive dropped-frame handling logic 106 marks the representation as unavailable. Marking the representation as unavailable means that it is predicted that the representation, if used by client device 104, may result in a dropped-frame ratio that is undesirable. For example, using the representation may result in in-playback dropped-frame handling logic 204 determining that the representation should not be used during the remainder of the playback and media player 110 switches to a different representation due to the dropped-frame ratio.

At 816, predictive dropped-frame handling logic 106 determines if more representations should be analyzed. If so, the process reiterates to 802 to retrieve a different representation and analyze that representation. If not, at 818, predictive dropped-frame handling logic 106 stores the availability decisions for the representations. For example, the representations that are predicted as being unavailable are marked as such.

Video Playback

Figure 9:
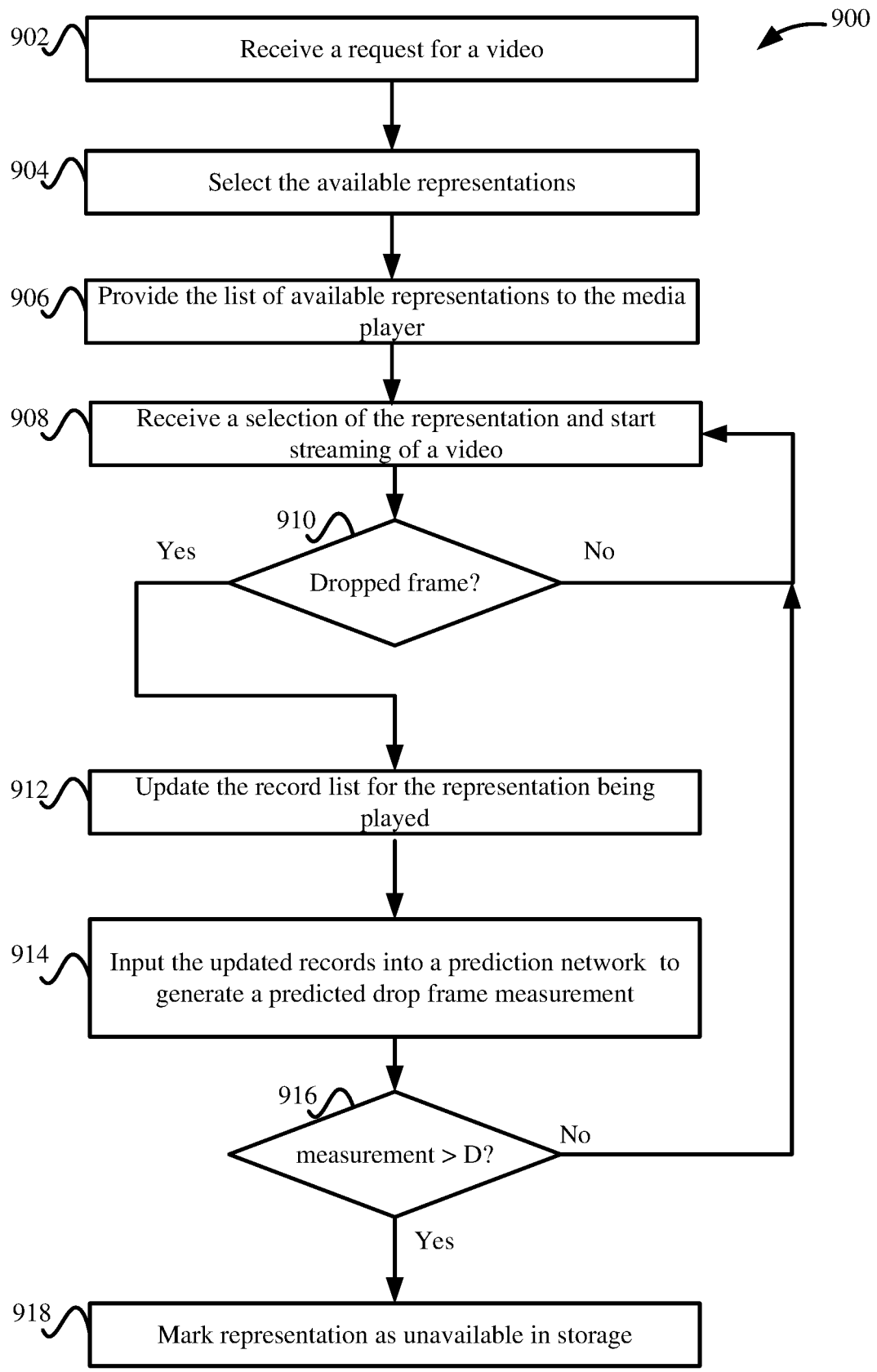
FIG. 9 depicts a simplified flowchart of a method for updating representations according to some embodiments.

The predictive dropped-frame ratios may be used before playback and during playback. FIG. 9 depicts a simplified flowchart 900 of a method for updating representations according to some embodiments. At 902, server system 102 receives a request for a video. For example, media player 110 will receive a selection for a video from a client device 104 being used by a user. At 904, server system 102 may select the available representations for the video. For example, server system 102 determines which representations have not been marked as unavailable for client device 104. The determination of the unavailable representations may be based on the client device, a user account, a media player, etc., or any combination thereof. Then, at 906, server system 102 provides the list of available representations to media player 110. At 908, server system 102 receives a selection of a representation and starts streaming of a video using the representation.

During the streaming of the video, one or more dropped frames may occur during playback of the video at 910. If no dropped frames occurred in the video, server system 102 may return to 908 to receive another selection of a representation and video. However, if one or more dropped frames occurred, server system 102 may receive an indication that one or more dropped frames occurred. At 912, server system 102 updates the record list for the representation being played. This is the record of dropped-frame ratios for the representation in the historical playback performance information. Then, at 914, server system 102 inputs the updated records into prediction network 306 to predict a new dropped-frame ratio measurement. At 916, server system 102 determines if the measurement is greater than a threshold D. If so, at 918, server system 102 marks the representation as unavailable in storage. If not, the process continues at 908 where a user can request the representation and start streaming of another video.

Figure 10:
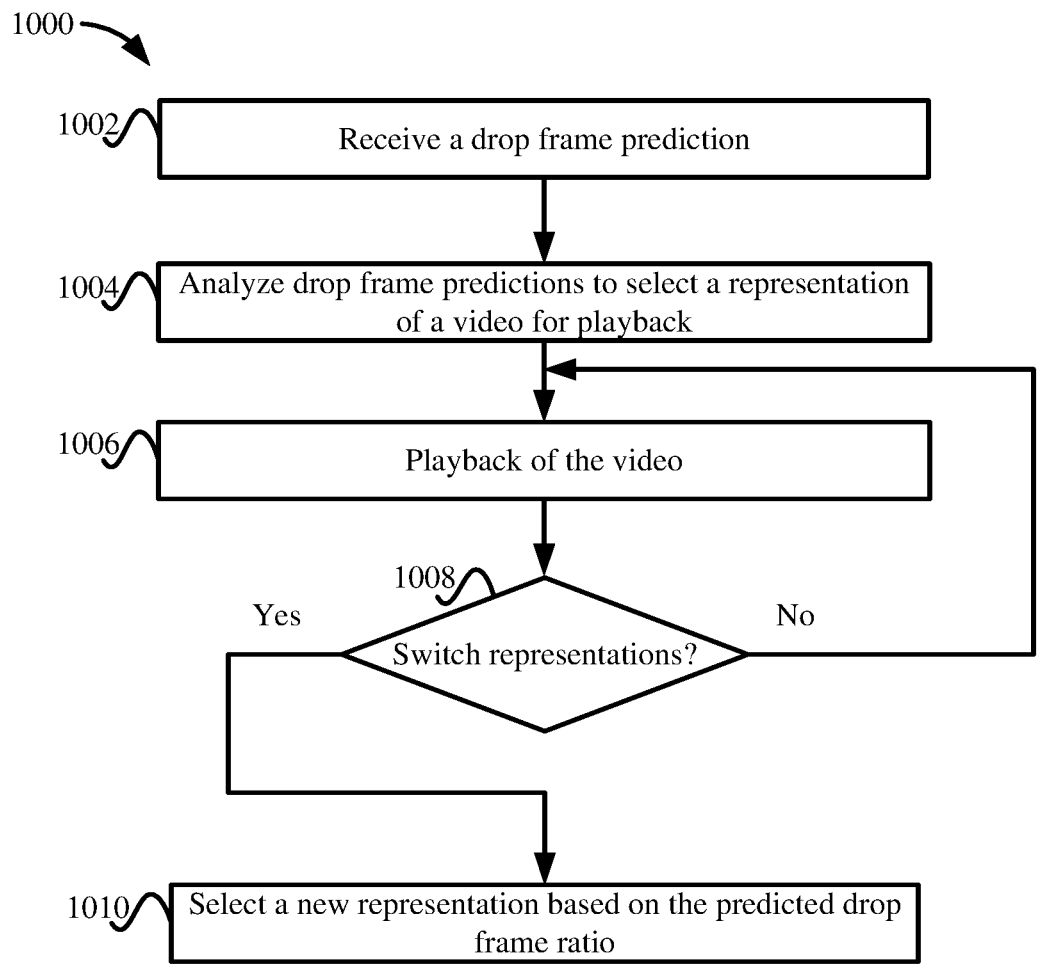
FIG. 10 depicts a simplified flowchart of a method for using the dropped-frame prediction during playback according to some embodiments.

Media player 110 may use the dropped-frame prediction during playback of a representation. FIG. 10 depicts a simplified flowchart 1000 of a method for using the dropped-frame prediction during playback according to some embodiments. At 1002, media player 110 receives a dropped-frame prediction. For example, when media player 110 requests a representation, server system 102 may send the list of representations that are available in addition to the dropped-frame prediction for each representation.

At 1004, media player 110 may analyze dropped-frame predictions to select a representation of a video for playback. Media player 110 may determine an optimal representation based on the dropped-frame predictions. For example, if a first representation has a higher dropped-frame ratio than a second representation, media player 110 may opt to select the second representation. In some examples, the first representation may be associated with a higher resolution than the second representation, but the representation with the lower resolution may be better because fewer frames may be dropped and media player 110 may not have to make a switch in the representation during playback.

At 1006, media player 110 starts playback of the video. At 1008, media player 110 may determine whether to switch representations. In some embodiments, media player 110 may consider the predictive dropped-frame ratios for the representations when switching representations. For example, similar to above, media player 110 may consider the dropped-frame ratio when selecting a new representation. If the switch in representations is not to be performed, the process continues playback of the video. However, if the decision is to switch representations, at 1010, media player 110 selects a new representation based on the predicted dropped-frame ratio.

Conclusion

Accordingly, the predicted dropped-frame ratio may improve the playback process. For example, representations may be marked as unavailable before playback and any dropped frames using the representations during playback may be avoided. Also, the prediction may be used to select a representation before playback based on predictive dropped-frame ratios for the available representations. Further, during playback, when a switch to another representation is encountered, the predicted dropped-frame ratios may also be used to select a new representation. Using the predicted dropped-frame ratios improves the playback by avoiding selecting a representation that may result in a large number of dropped frames or selecting an optimal representation that may result in fewer dropped frames than other representations.

Embodiments

In some embodiments, a method includes: receiving, by a computing device, playback information for a plurality of representations based on one or more videos being played at a media player, wherein the plurality of representations have at least one different characteristic that affects playback of the video; predicting, by the computing device, a dropped-frame measurement for the plurality of representations based on the playback information; comparing, by the computing device, the dropped-frame measurement to a threshold for the plurality of representations; and marking, by the computing device, a first set of the plurality of representations as not being available based on the comparing, wherein a second set of the plurality of representations are provided to the media player when the media player requests a video for playback and the first set of the plurality of representations for the video are blocked from being requested by the media player.

In some embodiments, the method includes training a prediction network to predict the dropped-frame measurement for the plurality of representations.

In some embodiments, training the prediction network includes: selecting a list of playback information for training; generating training samples from the list of playback information; and using the training samples to train the prediction network.

In some embodiments, generating the training samples includes: generating a dropped-frame measurement for a training sample based on the playback information; and generating a time value for the training sample based on the playback information.

In some embodiments, the dropped-frame measurement comprises a dropped-frame measurement from a first instance of playback information.

In some embodiments, the time value comprises a difference in time values from the first instance of playback information and a second instance of playback information.

In some embodiments, generating the training samples includes: generating a training sample that includes a plurality of instances of playback information, wherein a number of the plurality of instances is equal to a number of inputs of the prediction network.

In some embodiments, the training sample includes a plurality of time values, wherein a number of time values is equal to the number of inputs of the prediction network.

In some embodiments, marking the first set of the plurality of representations as not being available comprises:

In some embodiments, the method includes marking the representation as unavailable when the predicted drop frame measurement meets the threshold.

In some embodiments, the method includes: receiving a request for playback for the video; and selecting the second set of the plurality of representations for the video.

In some embodiments, selecting the second set of the plurality of representations for the video includes: determining representations that are stored for the video; determining which representations are marked as unavailable; and selecting the second set of representations from representations that are stored and not marked as unavailable.

In some embodiments, the method includes sending the second set of the plurality of representations for the video to the media player to allow the media player to select one of the second set of the plurality of representations for playback.

In some embodiments, the method includes sending the predicted drop frame measurement for the second set of the plurality of representations for the video to the media player, wherein the media player uses the predicted drop frame measurement to select one of the second set of the plurality of representations during playback of the video.

In some embodiments, the plurality of representations have different combinations of resolution and frame rate.

In some embodiments, a non-transitory computer-readable storage medium includes instructions, that when executed, control a computer system to be operable for: receiving playback information for a plurality of representations based on one or more videos being played at a media player, wherein the plurality of representations have at least one different characteristic that affects playback of the video; predicting a dropped-frame measurement for the plurality of representations based on the playback information; comparing the dropped-frame measurement to a threshold for the plurality of representations; and marking a first set of the plurality of representations as not being available based on the comparing, wherein a second set of the plurality of representations are provided to the media player when the media player requests a video for playback and the first set of the plurality of representations for the video are blocked from being requested by the media player.

In some embodiments, the instructions are further operable for training a prediction network to predict the dropped-frame measurement for the plurality of representations.

In some embodiments, marking the first set of the plurality of representations as not being available includes: marking the representation as unavailable when the predicted drop frame measurement meets the threshold.

In some embodiments, the instructions are further operable for sending the second set of the plurality of representations for the video to the media player to allow the media player to select one of the second set of the plurality of representations for playback.

In some embodiments, the instructions are further operable for sending the predicted drop frame measurement for the second set of the plurality of representations for the video to the media player, wherein the media player uses the predicted drop frame measurement to select one of the second set of the plurality of representations during playback of the video.

In some embodiments, an apparatus includes: one or more computer processors; and a non-transitory computer-readable storage medium comprising instructions, that when executed, control the one or more computer processors to be operable for: receiving playback information for a plurality of representations based on one or more videos being played at a media player, wherein the plurality of representations have at least one different characteristic that affects playback of the video; predicting a dropped-frame measurement for the plurality of representations based on the playback information; comparing the dropped-frame measurement to a threshold for the plurality of representations; and marking a first set of the plurality of representations as not being available based on the comparing, wherein a second set of the plurality of representations are provided to the media player when the media player requests a video for playback and the first set of the plurality of representations for the video are blocked from being requested by the media player.

System

Figure 11:
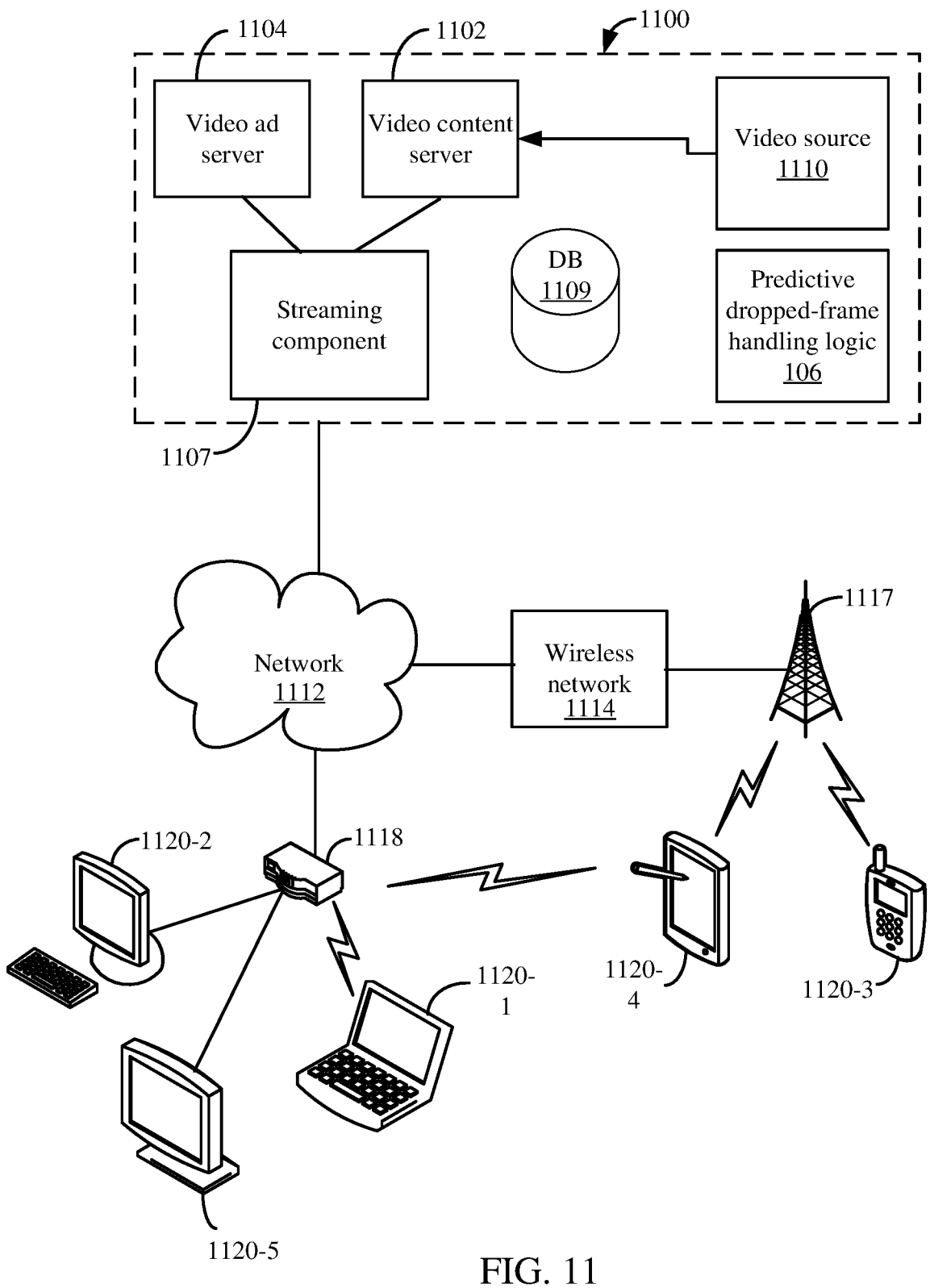
FIG. 11 depicts a video streaming system in communication with multiple client devices via one or more communication networks according to one embodiment.

Features and aspects as disclosed herein may be implemented in conjunction with a video streaming system 1100 in communication with multiple client devices via one or more communication networks as shown in FIG. 11. Aspects of the video streaming system 1100 are described merely to provide an example of an application for enabling distribution and delivery of content prepared according to the present disclosure. It should be appreciated that the present technology is not limited to streaming video applications and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 1100, video data may be obtained from one or more sources for example, from a video source 1110, for use as input to a video content server 1102. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 1100 may include one or more computer servers or modules 1102, 1104, and/or 1107 distributed over one or more computers. Each server 1102, 1104, 1107 may include, or may be operatively coupled to, one or more data stores 1109, for example databases, indexes, files, or other data structures. A video content server 1102 may access a data store (not shown) of various video segments. The video content server 1102 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 1104 may access a data store of relatively short videos (e.g., 10 second, 30 second, or 60 second video advertisements) configured as advertising for a particular advertiser or message. The advertising may be provided for an advertiser in exchange for payment of some kind or may comprise a promotional message for the system 1100, a public service message, or some other information. The video advertising server 1104 may serve the video advertising segments as directed by a user interface controller (not shown).

The video streaming system 1100 also may include predictive dropped-frame handling logic 106.

The video streaming system 1100 may further include an integration and streaming component 1107 that integrates video content and video advertising into a streaming video segment. For example, streaming component 1107 may be a content server or streaming media server. A controller (not shown) may determine the selection or configuration of advertising in the streaming video based on any suitable algorithm or process. The video streaming system 1100 may include other modules or units not depicted in FIG. 11, for example, administrative servers, commerce servers, network infrastructure, advertising selection engines, and so forth.

The video streaming system 1100 may connect to a data communication network 1112. A data communication network 1112 may comprise a local area network (LAN), a wide area network (WAN), for example, the Internet, a telephone network, a wireless cellular telecommunications network (WCS) 1114, or some combination of these or similar networks.

One or more client devices 1120 may be in communication with the video streaming system 1100, via the data communication network 1112, wireless cellular telecommunications network 1114, and/or another network. Such client devices may include, for example, one or more laptop computers 1120-1, desktop computers 1120-2, "smart" mobile phones 1120-3, tablet devices 1120-4, network-enabled televisions 1120-5, or combinations thereof, via a router 1118 for a LAN, via a base station 1117 for a wireless cellular telecommunications network 1114, or via some other connection. In operation, such client devices 1120 may send and receive data or instructions to the system 1100, in response to user input received from user input devices or other input. In response, the system 1100 may serve video segments and metadata from the data store 1109 responsive to selection of media programs to the client devices 1120. Client devices 1120 may output the video content from the streaming video segment in a media player using a display screen, projector, or other video output device, and receive user input for interacting with the video content.

Distribution of audio-video data may be implemented from streaming component 1107 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 1107 may communicate with client device 1120 using control messages and data messages to adjust to changing network conditions as the video is played. These control messages can include commands for enabling control functions such as fast forward, fast reverse, pausing, or seeking to a particular part of the file at the client.

Since streaming component 1107 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 1107 may use TCP-based protocols, such as HTTP and Real Time Messaging Protocol (RTMP). Streaming component 1107 can also deliver live webcasts and can multicast, which allows more than one client to tune into a single stream, thus saving bandwidth. Streaming media players may not rely on buffering the whole video to provide random access to any point in the media program. Instead, this is accomplished through the use of control messages transmitted from the media player to the streaming media server. Other protocols used for streaming are Hypertext Transfer Protocol (HTTP) live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 12:
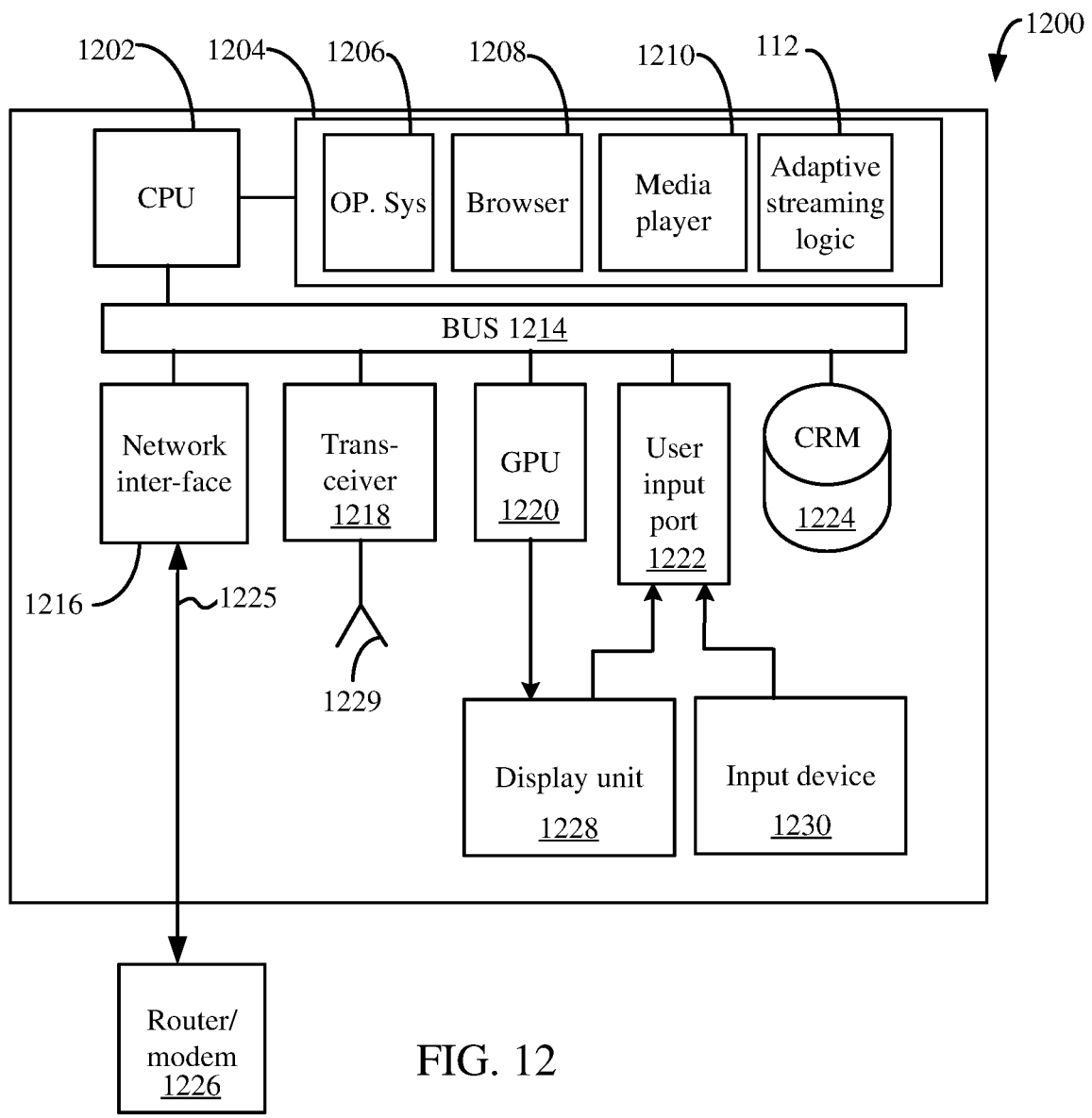
FIG. 12 depicts a diagrammatic view of an apparatus for viewing video content and advertisements.

Referring to FIG. 12, a diagrammatic view of an apparatus 1200 for viewing video content and advertisements is illustrated. In selected embodiments, the apparatus 1200 may include a processor (CPU) 1202 operatively coupled to a processor memory 1204, which holds binary-coded functional modules for execution by the processor 1202. Such functional modules may include an operating system 1206 for handling system functions such as input/output and memory access, a browser 1208 to display web pages, and media player 1210 for playing video. The modules may further include adaptive streaming logic 112. The memory 1204 may hold additional modules not shown in FIG. 12, for example modules for performing other operations described elsewhere herein.

A bus 1214 or other communication component may support communication of information within the apparatus 1200. The processor 1202 may be a specialized or dedicated microprocessor configured or operable to perform particular tasks in accordance with the features and aspects disclosed herein by executing machine-readable software code defining the particular tasks. Processor memory 1204 (e.g., random access memory (RAM) or other dynamic storage device) may be connected to the bus 1214 or directly to the processor 1202, and store information and instructions to be executed by a processor 1202. The memory 1204 may also store temporary variables or other intermediate information during execution of such instructions.

A computer-readable medium in a storage device 1224 may be connected to the bus 1214 and store static information and instructions for the processor 1202; for example, the storage device (CRM) 1224 may store the modules 1206, 1208, 1210 and 1212 when the apparatus 1200 is powered off, from which the modules may be loaded into the processor memory 1204 when the apparatus 1200 is powered up. The storage device 1224 may include a non-transitory computer-readable storage medium holding information, instructions, or some combination thereof, for example instructions that when executed by the processor 1202, cause the apparatus 1200 to be configured or operable to perform one or more operations of a method as described herein.

A communication interface 1216 may also be connected to the bus 1214. The communication interface 1216 may provide or support two-way data communication between the apparatus 1200 and one or more external devices, e.g., the streaming system 1100, optionally via a router/modem 1226 and a wired or wireless connection. In the alternative, or in addition, the apparatus 1200 may include a transceiver 1218 connected to an antenna 1229, through which the apparatus 1200 may communicate wirelessly with a base station for a wireless communication system or with the router/modem 1226. In the alternative, the apparatus 1200 may communicate with a video streaming system 1100 via a local area network, virtual private network, or other network. In another alternative, the apparatus 1200 may be incorporated as a module or component of the system 1100 and communicate with other components via the bus 1214 or by some other modality.

The apparatus 1200 may be connected (e.g., via the bus 1214 and graphics processing unit 1220) to a display unit 1228. A display 1228 may include any suitable configuration for displaying information to an operator of the apparatus 1200. For example, a display 1228 may include or utilize a liquid crystal display (LCD), touchscreen LCD (e.g., capacitive display), light emitting diode (LED) display, projector, or other display device to present information to a user of the apparatus 1200 in a visual display.

One or more input devices 1230 (e.g., an alphanumeric keyboard, microphone, keypad, remote controller, game controller, camera or camera array) may be connected to the bus 1214 via a user input port 1222 to communicate information and commands to the apparatus 1200. In selected embodiments, an input device 1230 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 1228, for example using a touch sensitive screen. A cursor control device may communicate direction information and command selections to the processor 1202 and control cursor movement on the display 1228. A cursor control device may have two or more degrees of freedom, for example allowing the device to specify cursor positions in a plane or three-dimensional space.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method comprising:
   receiving, by a computing device, playback information for a plurality of representations based on one or more videos that have been played, wherein the plurality of representations have at least one different characteristic that affects playback of a respective representation;
   predicting, by the computing device, a playback performance measurement for a first representation and a second representation in the plurality of representations based on the playback information;
   comparing, by the computing device, the playback performance measurement to a threshold for the first representation and the second representation; and
   before playback of a video, marking, by the computing device, the first representation as not being available during a playback session of the video based on the comparing, wherein the second representation is provided to a media player as being available to request during the playback session of the video based on the comparing, and wherein the first representation for the video is blocked from being requested by the media player during the playback session of the video.

2. The method of claim 1, further comprising:
training a prediction network to predict the playback performance measurement for the plurality of representations.

3. The method of claim 2, wherein training the prediction network comprises:
selecting a list of playback information for training;
generating training samples from the list of playback information; and
using the training samples to train the prediction network.

4. The method of claim 3, wherein generating the training samples comprises:
generating a playback performance measurement for a training sample based on the playback information; and
generating a time value for the training sample based on the playback information.

5. The method of claim 4, wherein the playback performance measurement comprises a playback performance measurement from a first instance of playback information.

6. The method of claim 5, wherein the time value comprises a difference in time values from the first instance of playback information and a second instance of playback information.

7. The method of claim 3, wherein generating the training samples comprises:
generating a training sample that includes a plurality of instances of playback information, wherein a number of the plurality of instances is equal to a number of inputs of the prediction network.

8. The method of claim 7, wherein the training sample includes a plurality of time values, wherein a number of time values is equal to the number of inputs of the prediction network.

9. The method of claim 1, wherein marking the first representation as not being available comprises:
marking the first representation as unavailable when the predicted playback performance measurement meets the threshold.

10. The method of claim 1, further comprising:
receiving a request for playback for the video; and
selecting a set of the plurality of representations for the video.

11. The method of claim 10, wherein selecting the set of the plurality of representations for the video comprises:
determining representations that are stored for the video;
determining which representations are marked as unavailable; and
selecting the set of representations from representations that are stored and not marked as unavailable.

12. The method of claim 10, further comprising:
sending the set of the plurality of representations for the video to the media player to allow the media player to select one of the set of the plurality of representations for playback.

13. The method of claim 12, further comprising:
sending the predicted playback performance measurement for the set of the plurality of representations for the video to the media player, wherein the media player uses the predicted playback performance measurement to select one of the set of the plurality of representations during playback of the video.

14. The method of claim 12, wherein the plurality of representations have different combinations of resolution and frame rate.

15. A non-transitory computer-readable storage medium containing instructions, that when executed, control a computer system to be operable for:
receiving playback information for a plurality of representations based on one or more videos that have been played, wherein the plurality of representations have at least one different characteristic that affects playback of a respective representation;
predicting a playback performance measurement for a first representation and a second representation in the plurality of representations based on the playback information;
comparing the playback performance measurement to a threshold for the first representation and the second representation; and
before playback of a video, marking the first representation as not being available during a playback session of the video based on the comparing, wherein the second representation is provided to a media player as being available to request during the playback session of the video based on the comparing, and wherein the first representation for the video is blocked from being requested by the media player during the playback session of the video.

16. The non-transitory computer-readable storage medium of claim 15, further operable for:
training a prediction network to predict the playback performance measurement for the plurality of representations.

17. The non-transitory computer-readable storage medium of claim 15, wherein marking the first representation as not being available comprises:
marking the first representation as unavailable when the predicted playback performance measurement meets the threshold.

18. The non-transitory computer-readable storage medium of claim 15, further operable for:
sending a set of the plurality of representations for the video to the media player to allow the media player to select one of the set of the plurality of representations for playback.

19. The non-transitory computer-readable storage medium of claim 18, further operable for:
sending the predicted playback performance measurement for a set of the plurality of representations for the video to the media player, wherein the media player uses the predicted playback performance measurement to select one of the set of the plurality of representations during playback of the video.

20. An apparatus comprising:
one or more computer processors; and
a non-transitory computer-readable storage medium comprising instructions, that when executed, control the one or more computer processors to be operable for:
receiving playback information for a plurality of representations based on one or more videos that have been played, wherein the plurality of representations have at least one different characteristic that affects playback of a respective representation;
predicting a playback performance measurement for a first representation and a second representation in the plurality of representations based on the playback information;
comparing the playback performance measurement to a threshold for the first representation and the second representation; and
before playback of a video, marking the first representation as not being available during a playback session of the video based on the comparing, wherein the second representation is provided to a media player as being available to request during the playback session of the video based on the comparing, and wherein the first representation for the video is blocked from being requested by the media player during the playback session of the video.

\* \* \* \* \*